United States Patent
Wang et al.

(10) Patent No.: US 10,936,973 B1
(45) Date of Patent: Mar. 2, 2021

(54) ADVERSARIAL EXAMPLE DETECTION METHOD AND APPARATUS, COMPUTING DEVICE, AND NON-VOLATILE COMPUTER-READABLE STORAGE MEDIUM

(71) Applicant: DONGGUAN UNIVERSITY OF TECHNOLOGY, Dongguan (CN)

(72) Inventors: Yi Wang, Dongguan (CN); Bo Huang, Dongguan (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 0 days.

(21) Appl. No.: 16/939,307

(22) Filed: Jul. 27, 2020

Related U.S. Application Data (63) Continuation of application No. PCT/CN2019/100551, filed on Aug. 14, 2019.

(51) Int. Cl.
*G06N 20/00* (2019.01)
*G06N 5/02* (2006.01)

(52) U.S. Cl.
CPC .............. *G06N 20/00* (2019.01); *G06N 5/02* (2013.01)

(58) Field of Classification Search
CPC ... G06K 9/6256–6259; G06K 9/6267–9/5287; G06N 5/02; G06N 20/00
See application file for complete search history.

(56) References Cited

U.S. PATENT DOCUMENTS 10,733,287 B2 * 8/2020 Kesarwani ............ G06F 21/125
2017/0323202 A1 11/2017 Wang et al.
(Continued)

FOREIGN PATENT DOCUMENTS

| CN | 108664999 A | 10/2018 |
|---|---|---|
| CN | 109460814 A | 3/2019 |

(Continued)

OTHER PUBLICATIONS

Goodfellow, Ian J. et al; Explaining and Harnessing Adversarial Examples; Published as a conference paper at ICLR 2015; pp. 1-11. (Year: 2015).*

(Continued)

*Primary Examiner* — Stanley K. Hill
(74) *Attorney, Agent, or Firm* — IPro, PLLC (57) ABSTRACT

An adversarial example detection method includes: acquiring training examples and training example labels corresponding thereto, wherein the training example labels comprises normal examples and adversarial examples; inputting the training examples into a target model to obtain a first predicted score vector of the training examples; adding a random perturbation at N times to the training examples to obtain N groups of comparative training examples; respectively inputting the N groups of comparative training examples into the target model to obtain a second predicted score vector of each group of comparative training examples; constructing feature data according to the first predicted score vector and the second predicted score vector of each group of comparative training examples; training a classification model according to the feature data and the training example labels corresponding to the feature to obtain a detector; and detecting input test data according to the detector.

14 Claims, 5 Drawing Sheets

(56) References Cited

U.S. PATENT DOCUMENTS

| | | | | |
|---|---|---|---|---|
| 2019/0220755 A1* | 7/2019 | Carbune | ............... | G06N 3/084 |
| 2019/0303720 A1* | 10/2019 | Karam | ................... | G06K 9/624 |
| 2020/0134468 A1* | 4/2020 | Ding | .................... | G06K 9/6256 |
| 2020/0265271 A1* | 8/2020 | Zhang | .................. | G06K 9/6232 |

FOREIGN PATENT DOCUMENTS

| | | |
|---|---|---|
| CN | 109492582 A | 3/2019 |
| CN | 109639710 A | 4/2019 |

OTHER PUBLICATIONS

Papernot, Nicolas et al.; Distillation as a Defense to Adversarial Perturbations against Deep Neural Networks; 2016 IEEE Symposium on Security and Privacy; pp. 582-597. (Year: 2016).*

Kurakin, Alexey et al.; Adversarial Machine Learning at Scale; Published as a conference paper at ICLR 2017; pp. 1-17. (Year: 2017).*

Akhtar, Naveed et al.; Threat of Adversarial Attacks on Deep Learning in Computer Vision: A Survey; 2018 IEEE; Digital Object Identifier 10.1109/ACCESS.2018.2807385; pp. 14410-14430. (Year: 2018).*

Su, Jiawei et al.; Pixel Attack for Fooling Deep Neural Networks; IEEE Transactions on Evolutionary Computation, vol. 23, No. 5, Oct. 2019; pp. 828-841. (Year: 2019).*

Madry, Aleksander et al.; Towards Deep Learning Models Resistant to Adversarial Attacks; 2019 MIT; pp. 1-28. (Year: 2019).*

Tramer, Florian et al.; Ensemble Adversarial Training: Attacks and Defenses; Published as a conference paper at ICLR 2018; pp. 1-22. (Year: 2020).*

Tramer, Florian et al.; Ensemble Adversarial Training: Attacks and Defenses; ICLR 2018; pp. 1-20. (Year: 2018).*

Written Opinion of the International Searching Authority dated Nov. 5, 2020; PCT/CN2019/100551.

* cited by examiner

ADVERSARIAL EXAMPLE DETECTION METHOD AND APPARATUS, COMPUTING DEVICE, AND NON-VOLATILE COMPUTER-READABLE STORAGE MEDIUM

CROSS-REFERENCE TO RELATED APPLICATIONS

This application is a continuation of International Application No. PCT/CN2019/100551, with an international filing date of Aug. 14, 2019, the entire contents of which are incorporated herein by reference.

TECHNICAL FIELD

The present application relates to the technical field of machine learning, and in particular, relates to an adversarial example detection method and apparatus, a computing device, and a non-volatile computer-readable storage medium.

BACKGROUND

Machine learning, as an important data analysis tool, has been widely used in biometric identification, automobile automatic driving, machine vision, and the like application fields. While bringing great convenience to users, the machine learning is also subject to some security issues. Tiny and unnoticeable perturbations are added to original examples to generate adversarial examples, and a machine learning model is prone to attacks by the adversarial examples. For example, with respect to characteristics of a face recognition model, tiny perturbations are added to an original face image, such that the face recognition model makes a misclassification. This also applies to malicious control of automatic driving of automobiles, voice control system, and the like. An attacker may add tiny perturbations to an original example to generate an adversarial example, such that the adversarial example is mis-identified by a smart system and hence malicious damages are caused.

At present, the adversarial examples may be mainly treated by prevention and detection. The prevention refers to constructing a more robust model, and the detection is intended to distinguishing the normal examples from the adversarial examples by a method. In adaptive adversarial attacks, the attacker not only knows all the information of a target model, but also acknowledges a used policy for dealing with the adversarial attacks. In this case, the attacker may be intended to construct adversarial examples which not only successfully attacks the target model but also work around the prevention. Therefore, these two methods may both fail in the adaptive attacks. Until now, no adversarial example detection method applicable to various target models is proposed.

SUMMARY

An embodiment of the disclosure provides an adversarial example detection method. The method includes: acquiring training examples and training example labels corresponding thereto, wherein the training example labels comprises normal examples and adversarial examples; inputting the training examples into a target model to obtain a first predicted score vector of the training examples; adding a random perturbation at N times to the training examples to obtain N groups of comparative training examples, wherein N is a natural number greater than 0; respectively inputting the N groups of comparative training examples into the target model to obtain a second predicted score vector of each group of comparative training examples; constructing feature data according to the first predicted score vector and the second predicted score vector of each group of comparative training examples; training a classification model according to the feature data and the training example labels corresponding to the feature to obtain a detector; and detecting input test data according to the detector.

Another embodiment of the disclosure provides a computing device. The computing device includes: a processor, a memory, a communication interface, and a communication bus; wherein the processor, the memory, and the communication bus communicate with each other via the communication bus; and the memory is configured to store at least one executable instruction, wherein the executable instruction causes the processor to perform the steps of: acquiring training examples and training example labels corresponding thereto, wherein the training example labels comprises normal examples and adversarial examples; inputting the training examples into a target model to obtain a first predicted score vector of the training examples; adding a random perturbation at N times to the training examples to obtain N groups of comparative training examples, wherein N is a natural number greater than 0; respectively inputting the N groups of comparative training examples into the target model to obtain a second predicted score vector of each group of comparative training examples; constructing feature data according to the first predicted score vector and the second predicted score vector of each group of comparative training examples; training a classification model according to the feature data and the training example labels corresponding to the feature to obtain a detector; and detecting input test data according to the detector.

Still another embodiment of the disclosure provides a non-volatile computer-readable storage medium. The storage medium storing at least one executable instruction; wherein the at least one executable instruction, when being executed by a processor, causes the processor to perform the steps of: acquiring training examples and training example labels corresponding thereto, wherein the training example labels comprises normal examples and adversarial examples; inputting the training examples into a target model to obtain a first predicted score vector of the training examples; adding a random perturbation at N times to the training examples to obtain N groups of comparative training examples, wherein N is a natural number greater than 0; respectively inputting the N groups of comparative training examples into the target model to obtain a second predicted score vector of each group of comparative training examples; constructing feature data according to the first predicted score vector and the second predicted score vector of each group of comparative training examples; training a classification model according to the feature data and the training example labels corresponding to the feature to obtain a detector; and detecting input test data according to the detector.

BRIEF DESCRIPTION OF THE DRAWINGS

One or more embodiments are illustratively described by using a diagram that corresponds to the one or more embodiments in the accompanying drawings. These exemplary descriptions do not constitute any limitation on the embodiments. Elements that have the same reference numerals in the accompanying drawings are represented as similar ele

DETAILED DESCRIPTION

For clearer descriptions of the objectives, technical solutions, and advantages of embodiments of the present application, the embodiments of the present application are described in detail with reference to accompanying drawings. However, persons of ordinary skill in the art may understand, in the embodiments of the present application, more technical details are provided for readers to better understand the present application. However, even though these technical details and various variations and modifications based on the embodiments hereinafter, the technical solutions of the present application may also be practiced.

The embodiments of the present application are applicable to adversarial example detection for a classified target model. The classified target model is any classification model in the conventional machine learning. With respect to different target models, different detectors may be obtained by training. However, the process of training the detector may be practiced by the method according to the embodiments. The detector obtained by training may be configured to detect an input example before a detection example is input to the target model, and deny making a predicted classification for an adversarial example. The adversarial example is an example formed by deliberately adding unnoticeable noise to the input detection example, and is intended to cause the target model to misclassify the detection example at a high confidence. With respect to an adversarial example, after a random perturbation is added, the target model is greatly affected. With respect to a normal example, after a random perturbation is added, the target model is slightly affected. According to a response of the target model, normal examples and adversarial examples can be distinguished. The specific embodiments are hereinafter described further.

Figure 1:
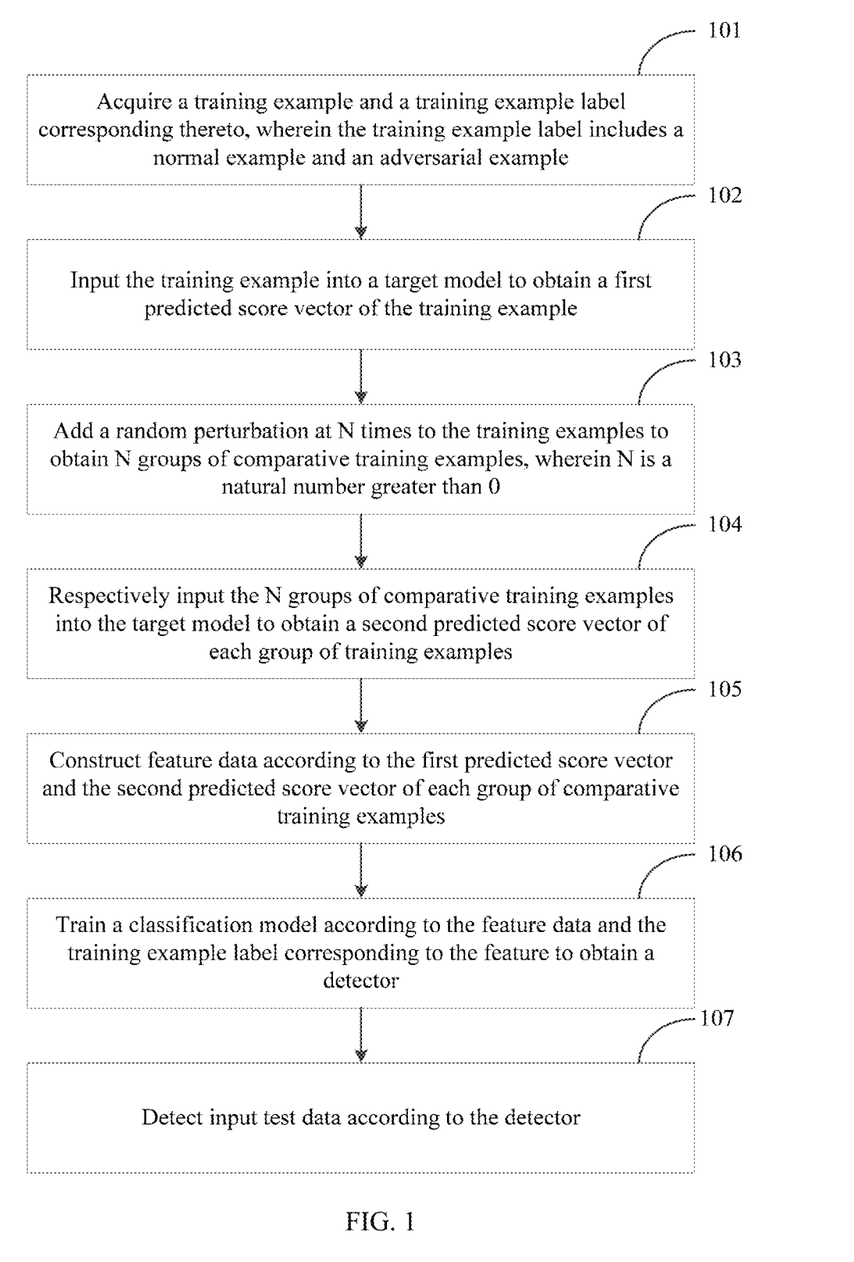
- FIG. 1 is a flowchart of an adversarial example detection method according to a first embodiment of the present application.

A first embodiment of the present application relates to an adversarial example detection method. A specific flowchart of the method is as illustrated in FIG. 1, and this embodiment specifically includes the following steps:

Step 101: Training examples and training example labels corresponding thereto are acquired, wherein the training example labels includes a normal example and an adversarial example.

In this step, the training examples refer to examples for training a detector, and the training examples are also input data of a target model. A plurality of training examples may be provided. Content included in each training example is related to the target model. For example, the target model is a face recognition model, and the content included in each training example is a face image. The training example labels refers to an example type corresponding to the training examples, and includes a normal example and an adversarial example. The normal example refers to an example that is not added with noise, and the adversarial example refers to an example obtained by adding noise to a normal example. Each training example corresponds to a training example label. In the specific implementation, noise is added to a normal example by an adversarial example generation algorithm to obtain an adversarial example. In this embodiment, the type of the adversarial example generation algorithm is not limited, and any commonly used adversarial example generation algorithm may be employed to generate the adversarial example in this embodiment, for example, Limited-memory Broyden-Fletcher-Goldfarb-Shanno (L-BFGS) method, Fast Gradient Sign (FGS) method, iteration method, or the like.

In a specific embodiment, by using examples in a training set of the target model, adversarial examples are generated by an adversarial example generation algorithm, and adversarial examples which are capable of successfully attack the target model are collected to obtain training examples whose training example labels are adversarial examples in this step, and then several examples are selected from the training set of the target model as the training examples whose training example labels are normal examples. A quantity of normal examples in the training examples may be consistent with or different from a quantity of adversarial examples in the training examples. If the quantity of normal examples is consistent with the quantity of adversarial examples, a detector is trained by using a binary classification model, for example, a binary SVM model, such that a finally trained detector gives no preference to the normal examples or the adversarial examples. In this way, the accuracy of the detector is improved.

Step 102: The training examples are input into a target model to obtain a first predicted score vector of the training examples.

In this step, the training examples are input into the target model to obtain a confidence vector corresponding to each training example. A maximum value in the confidence vectors is acquired to obtain a predicted score of each training example, and a vector constructed by the predicted score of each training example is taken as the first predicted score vector of the training examples.

The dimension of the confidence vector is related to a classification of the target model. For example, if the target model is a ten-classification classifier, the confidence vector corresponding to each training example is ten-dimensional, and each dimension represents a probability that the training example pertains to a classification. A classification corresponding to a maximum value of all the dimensions of the confidence vector is considered as the classification to which the training example pertains, and a confidence value corresponding to the dimension is determined as the predicted score of the training example. A vector constituted by the predicted scores of all the training examples is taken as the first predicted score vector of all the training examples.

It should be noted that elements in the obtained first predicted score vector one-to-one correspond to elements in the training examples, and a corresponding relationship between the training examples and the training example labels remains unchanged.

Step 103: A random perturbation is added at N times to the training examples to obtain N groups of comparative training examples, wherein N is a natural number greater than 0.

In this step, the random perturbation may be a random constant. Preferably, the random perturbation is generated according to a predetermined distribution function, wherein the predetermined distribution function is a distribution function having an average value of 0 and being symmetrically distributed. In this way, it is ensured that the random perturbation is random in terms of positive and negative values, and thus non-preference of the trained detector is improved. In a specific embodiment, the random distribution is a Gaussian distributed function with an average value of 0.

It should be noted that during adding the random perturbation to the training examples, each time the random perturbation is added, a group of comparative training examples are obtained, and N groups of comparative training examples are obtained after the random perturbation is added at N times. The comparative examples in each group one-to-one correspond to the training examples, and the example labels remain unchanged. For example, if N is 50, the random perturbation is added at 50 times to obtain totally 50 groups of comparative training examples.

Step 104: The N groups of comparative training examples are respectively input into the target model to obtain a second predicted score vector of each group of training examples.

In this step, for the process of computing the second predetermined score vector, reference may be made to the process of computing the first predicted score vector in step 102, which is not described herein any further.

In some other embodiments, for the sake of making the first predicted score vector be obviously different from the second predicted score vector, with respect to a target model, during training of the target model, a comparative training example whose label indicates a normal example in the comparative examples is added to the training examples, wherein the label is consistent with the labels corresponding to the training examples.

Step 105: Feature data is constructed according to the first predicted score vector and the second predicted score vector of each group of comparative training examples.

In this step, the feature data refers to feature data for training a detector. The feature data is determined according to a difference vector between the second predicted score vector of each group of comparative training examples and the first predicted score vector. In a specific embodiment, the difference vector between the first predicted score vector and the second predicted score vector of each group of training examples is computed, and the feature data is constructed according to the difference vectors of the N groups of comparative training examples. Selection of the feature data and a quantity of feature data may be determined by a person skilled in the art in the implementation of the embodiments of the present application, and the more the content of the difference vectors included in the feature data, the better the detection effect of the trained detector. The difference vector may be resulted from deduction of the first predicted score vector from the second predicted score vector, or may be resulted from some other computations based on a result of deduction of the first predicted score vector from the second predicted score vector, for example, computing a square of the difference upon deduction, computing a variation rate relative to the first predicted score vector, or the like. In a specific embodiment, the difference vector is a variation rate vector of the second predicted score vector of each group of comparative training examples relative to the first predicted score vector; and during computation of the variation rate vector, the result of deduction of the first predicted score vector from the second predicted score vector is divided by the first predicted score vector in an element division fashion to obtain the variation rate vector.

It should be noted that in an optional embodiment, denoising and dimension-reduction are performed for the difference vectors of the N groups of comparative training examples to obtain the feature data. Performing denoising for the difference vectors of the N groups of comparative training examples is to remove noise interference in the difference vectors and ensure that the obtained feature data is more distinctive relative to the normal examples and the adversarial examples. By dimension-reduction for the denoised difference vectors, the complexity of training the detector is lowered while it is ensured that the feature data is distinctive relative to the normal examples and the adversarial examples.

In some embodiments, denoising and dimension-reduction are implemented for the difference vectors by constructing an N-column difference matrix from the difference vectors of the N groups of comparative training examples and extracting several statistical features as the feature data. The statistical features reduce the interference caused by the noise to the difference vectors, and reduce the dimension of the N groups of difference vectors, such that the obtained feature data is more distinctive relative to the normal examples and the adversarial examples. This embodiment sets no limitation to the specific form of the statistical features and a quantity of used statistical features. For example, the statistical features may be a combination of statistical features such as an average value, a variance, a standard difference, and the like. For example, if the quantity of training examples is M and 10 statistical features are extracted for N elements in each row, then a total quantity of feature data extracted for the difference matrix is 10M.

Step 106: A classification model is trained according to the feature data and the training example label corresponding to the feature to obtain a detector.

In this step, the feature data is obtained according to the difference vector between the first predicted score vector of the comparative training example and the first predicted score vector of the training example. During computation of the difference vector, each training example and the training example label maintains an unchanged corresponding relationship therebetween. After the feature data is constructed, the feature data likewise carries the training example label of the corresponding training example. According to the feature data and the corresponding training example label, the classification model is trained to obtain the detector. The classification model may be any model capable of implementing binary classification. If the quantity of normal examples is consistent with the quantity of adversarial examples, a detector is trained by using a binary classification model, for example, a binary SVM model, such that a finally trained detector gives no preference to the normal examples or the adversarial examples. In this way, the accuracy of the detector is improved.

Step 107: Input test data is detected according to the detector.

In this step, the test data is input to the detector, and determine whether the input test data is an adversarial example according to a result output by the detector. In some embodiments, the detection result includes confidences corresponding to two example types, normal examples and adversarial examples, and the example type corresponding to a higher confidence is the type of the test data.

In the embodiment of the present application, the random perturbation is added at N times to the training examples to obtain the N groups of comparative training examples, the feature data is constructed according to the second predicted score vector of the N groups of comparative examples and the first predicted score vector of the training examples, the classification model is trained according to the feature data to obtain the detector, and the adversarial examples are detected by using the detector. The training examples include the normal examples and the adversarial examples, after the random perturbation is added at N times, the N groups of comparative training example obtained include the comparative training examples corresponding to the normal examples and the comparative training examples corresponding to the adversarial examples. After the training examples and the comparative training examples are added to the target model, the first predicted score vector and the second predicted score vector are respectively obtained. With respect to the normal examples, a difference between the first predicted score vector corresponding thereto and the second predicted score vector is large. With respect to the adversarial examples, a difference between the first predicted score value corresponding thereto and the second predicted score vector is small. The feature data constructed according to the first predicted score vector and the second predicted score vector may obviously distinguish the normal examples from the adversarial examples, such that the trained detector is capable of effectively detecting the adversarial examples. The adversarial example detection method according to the embodiments of the present application relies on response variations after the comparative examples added with the perturbation and the training examples are input into the target model, instead of relying on the type of the target model. Therefore, in the embodiments of the present application, reliable adversarial example detection may be performed for a classifier with any type of target model.

Figure 2:
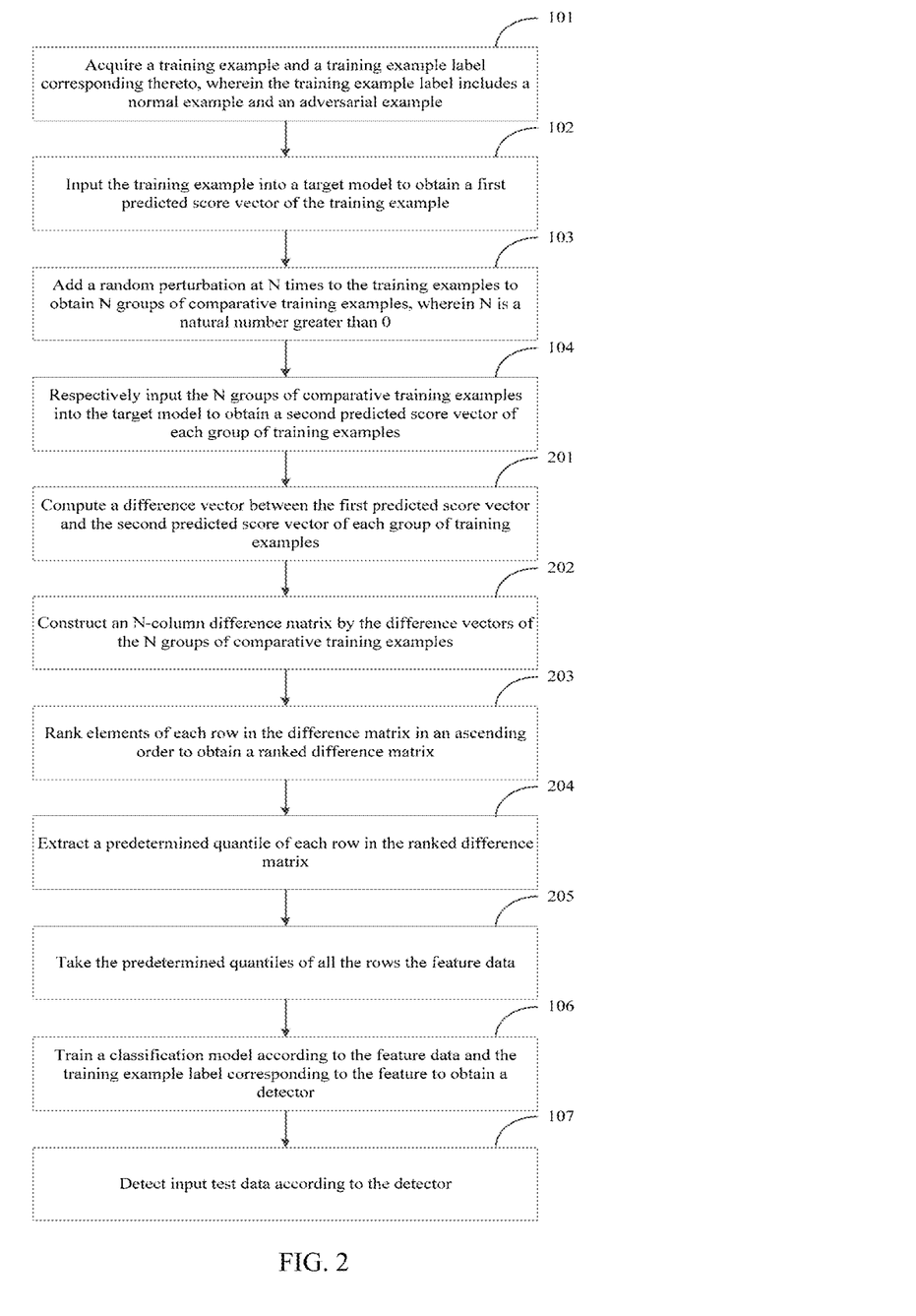
FIG. 2 is a flowchart of an adversarial example detection method according to a second embodiment of the present application.

A second embodiment of the present application relates to an adversarial example detection method. A specific process of the method is as illustrated in FIG. 2, this embodiment is different from the first embodiment in that step 105 specifically includes the following steps:

Step 201: A difference vector between the first predicted score vector and the second predicted score vector of each group of training examples is computed.

For the specific details of this step, reference may be made to the description in step 105 in the first embodiment, which is not described herein any further.

Step 202: An N-column difference matrix is constructed by the difference vectors of the N groups of comparative training examples.

In this step, the N groups of training examples are deducted from the training examples respectively to obtain N groups of difference vectors. Assuming that the quantity of training examples is M, then each group of the N groups of difference vectors includes M elements, and the N groups of difference vectors construct an M×N difference matrix. In the difference matrix, each row corresponds to N differences of one training example, and each column corresponds to one difference vector, that is, a difference vector obtained by deducting one group of comparative training examples from the corresponding examples of the training examples respectively.

Step 203: Elements of each row in the difference matrix are ranked in an ascending order to obtain a ranked difference matrix.

The elements in each row in the difference matrix represent a difference between a comparative example obtained after the random perturbation is added at one time to a training example, and the training example.

Step 204: A predetermined quantile of each row in the ranked difference matrix is extracted.

The quantile is a value point that partitions the elements in the difference vector into a plurality of equal parts, and a median, a quartile, a percentile, and the like are commonly used. Before extraction of the quantile, the difference vectors need to be ranked in an ascending order. The predetermined quantile indicates predetermined value points, which need to be extracted in each row in the ranked difference matrix. The quantity of predetermined quantiles is consistent with the quantity of feature data extracted from each row in the difference matrix. The embodiment of the present application sets no limitation to the specific value of the predetermined quantiles in each row, or to the quantity of quantiles. Preferably, the quantities of quantiles extracted from all the rows are consistent, to ensure that the detector gives no preference to training of the perturbation signal. For example, assuming that N is equal to 50, that is, the random perturbation is added at 50 times to the training examples, then the quantity of difference vectors is 50, and the constructed difference matrix includes 50 columns. Assuming that the quantity of training examples is M, then the constructed difference matrix includes M rows, 17 predetermined quantiles, for example, 10%, 15%, 20%, . . . , 90%, are respectively extracted from each row in the ranked difference matrix, that is, after 50 elements in each row are ranked and then 17 predetermined quantiles are extracted, the quantity of acquired feature data is 17M.

Step 205: The predetermined quantiles of all the rows is taken as the feature data.

The predetermined quantiles of all the rows are accumulated to obtain the feature data. When the quantity of predetermined quantiles extracted from each row is the same, assuming that the quantity is 17, then with respect to the M-row difference matrix constructed by the M training examples, the quantity of extracted feature data is 17M.

According to the present application, the predetermined quantiles are extracted from the difference matrix constituted by the difference vectors as the feature data, such that the feature data includes more information of the difference vectors. In addition, larger or smaller data at two ends of each row in the difference matrix is removed from the feature data extracted upon ranking, such that the detector trained by using the predetermined quantiles are the feature data is more robust.

Figure 3:
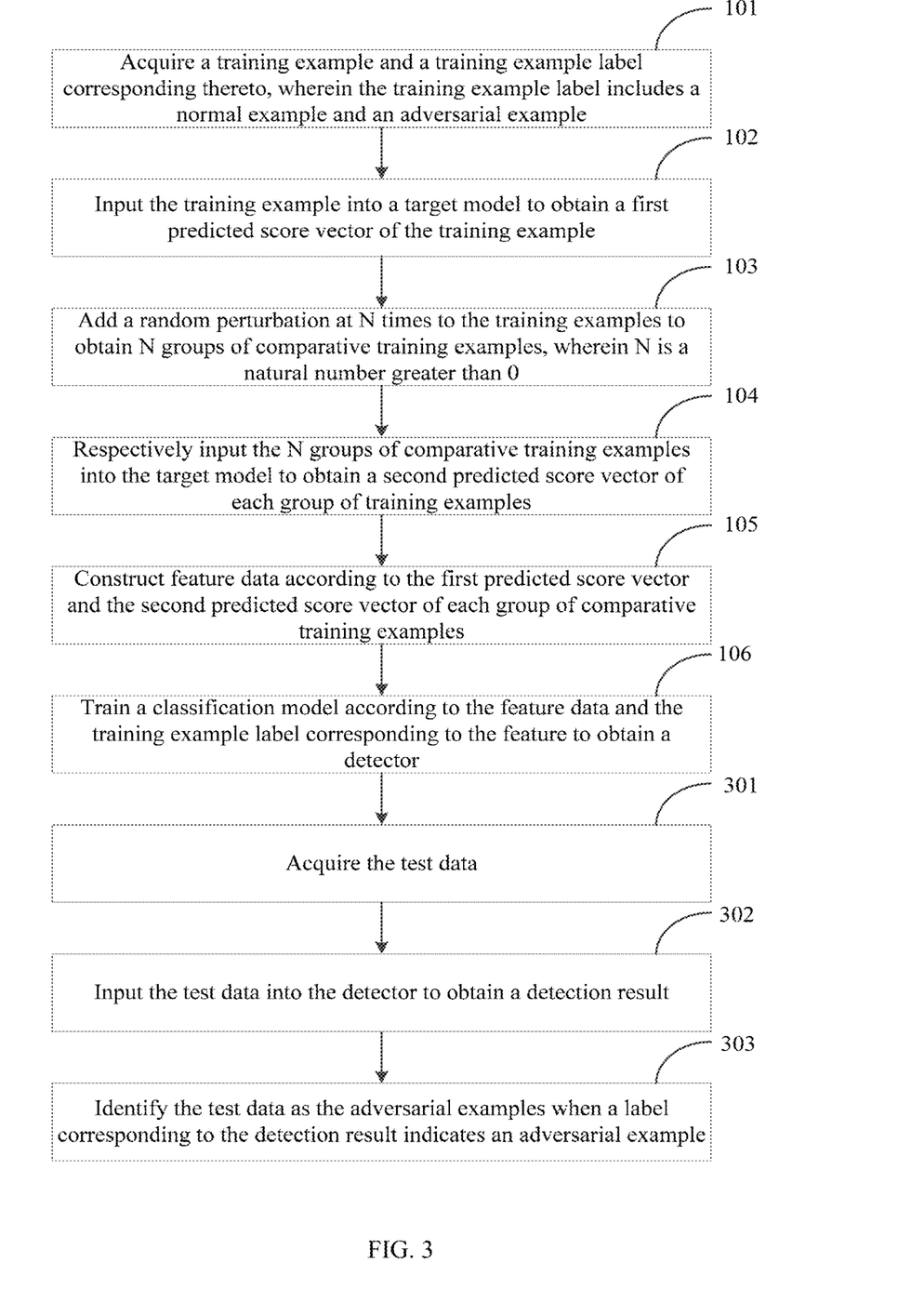
FIG. 3 is a flowchart of an adversarial example detection method according to a third embodiment of the present application.

A third embodiment of the present application relates to an adversarial example detection method. In this embodiment, step 107 further includes the following steps as illustrated in FIG. 3.

Step 301: The test data is acquired.

It should be noted that after the test data is acquired, the test data is pre-processed and the feature data is extracted therefrom, and the feature data is input into the detector to obtain a detection result. The type of the extracted feature data is the same as the type of the feature data extracted from the training examples during training of the detector.

Step 302: The test data is input into the detector to obtain a detection result.

The detector is obtained by training by the method for training the detector according to any one of the above embodiments.

Step 303: The test data is identified as the adversarial examples when a label corresponding to the detection result indicates an adversarial example.

In this step, a label of the test data is acquired by the detector, wherein the label includes a first label corresponding to the normal examples, and a second label corresponding to the adversarial examples. When an output result of the detector is the first label, the detection example is a normal example; and when the output result of the detector is the second label, the detection example is an adversarial example.

According to the embodiment of the present application, the acquired test data is detected by the detector, such that an example type corresponding to the test data is obtained. In this way, reliable detection of the adversarial examples is practiced. Adversarial example detection is performed for three types of classifiers, with the target models of MNIST, CIFAR-10, and ImageNet respectively by using the detector and the conventional detectors 1 and 2. The adversarial examples are generated by the attack algorithms BIM, DeepFool, and CW, and the corresponding success rates of the adversarial examples are as listed in Table 1.

TABLE 1

| Detector | | BIM | DeepFool | CW |
| --- | --- | --- | --- | --- |
| MNIST | Detector 1 | 0.931 | 0.908 | 0.890 |
| | Detector 2 | 0.997 | 0.995 | 0.995 |
| | Detector | 0.986 | 0.995 | 0.998 |
| CIFAR-10 | Detector 1 | 0.814 | 0.814 | 0.820 |
| | Detector 2 | 0.897 | 0.898 | 0.916 |
| | Detector | 0.928 | 0.984 | 0.957 |
| ImageNet | Detector 1 | 0.656 | 0.423 | 0.685 |
| | Detector 2 | 0.461 | 0.898 | 0.827 |
| | Detector | 0.919 | 0.910 | 0.869 |

Figure 4:
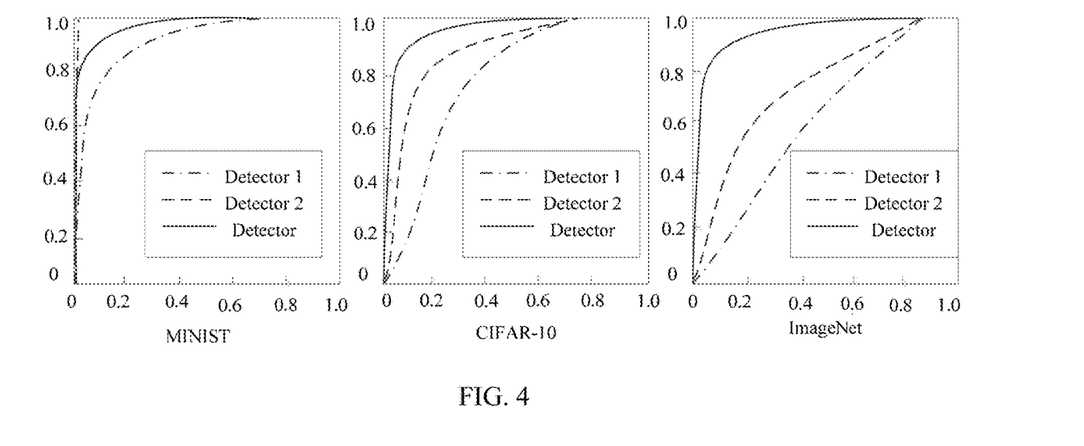
FIG. 4 is a ROC curve diagram of correct adversarial example detection in the adversarial example detection method according to the third embodiment of the present application.

The adversarial examples are set to be a positive class, and the normal examples are set to be a negative class. By the detector 1, the detector 2, and the detector according to the embodiment of the present application, the adversarial examples caused by the BIM are detected. With respect to the classifiers with the target models of MNIST, CIFAR-10, and ImageNet, an ROC curve illustrated in FIG. 4 showing that the adversarial examples are detected to be correct. In the ROC curve, the area below the curve represents an AUC score. A higher AUC score indicates a better effect of the trained detector in distinguishing the normal examples from the adversarial examples. Accordingly, the detector according to the embodiment of the present application achieves a better effect on detecting the adversarial examples.

Figure 5:
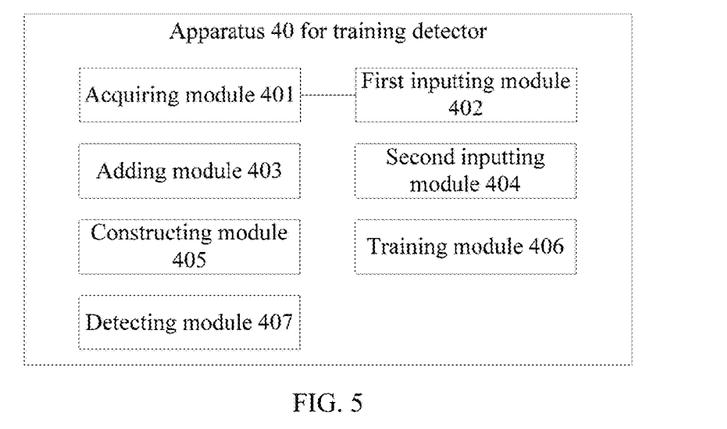
FIG. 5 is a functional block diagram of an adversarial example detection apparatus according to a fourth embodiment of the present application.

A fourth embodiment of the present application relates to an adversarial example detection apparatus. As illustrated in FIG. 5, an adversarial example detection apparatus 40 includes: an acquiring module 401, configured to acquire training examples and training example labels corresponding thereto, wherein the training example labels includes a normal example and an adversarial example; a first inputting module 402, configured to input the training example into a target model to obtain a first predicted score vector of the training example; an adding module 403, configured to add a random perturbation at N times to the training examples to obtain N groups of comparative training examples, wherein N is a natural number greater than 0; a second inputting module 404, configured to respectively input the N groups of training examples into the target model to obtain a second predicted score vector of each group of training examples; a constructing module 405, configured to construct feature data according to the first predicted score vector and the second predicted score vector of each group of training examples; a training module 406, configured to train a classification model according to the feature data and the training example label corresponding to the feature to obtain a detector; and a detecting module 407, configured to detect input test data according to the detector.

In an optional embodiment, the inputting module 401 is further configured to input the training example into the target model to obtain a confidence vector corresponding to each training example; acquire a maximum value in the confidence vectors to obtain a predicted score of each training example; and take a vector constructed by the predicted score of each training example as the first predicted score vector of the training example.

In an optional embodiment, the adding module 403 is further configured to generate the random perturbation according to a predetermined distribution function, the predetermined distribution function being a distribution function having an average value of 0 and being symmetrically distributed; and add a random perturbation at N times to the training examples to obtain N groups of comparative training examples.

In an optional embodiment, the predetermined distribution function is a Gaussian distribution function having an average value of 0.

In an optional embodiment, the constructing module 405 is further configured to compute the difference vector between the first predicted score vector and the second predicted score vector of each group of training examples is computed; and construct the feature data according to the difference vectors of the N groups of comparative training examples.

In an optional embodiment, computing the difference vector between the first predicted score vector and the second predicted score vector of each group of training examples includes: computing a variation rate vector of the second predicted score vector of the each group of comparative training examples relative to the first predicted score vector; and taking the variation rate vector as the difference vector.

In an optional embodiment, constructing the feature data according to the difference vectors of the N groups of comparative training examples includes: performing denoising and dimension-reduction for the difference vectors of the N groups of comparative training examples to obtain the feature data.

In an optional embodiment, performing the denoising and dimension-reduction for the difference vectors of the N groups of comparative training examples to obtain the feature data includes: constructing an N-column difference matrix by the difference vectors of the N groups of comparative training examples; ranking elements of each row in the difference matrix in an ascending order to obtain a ranked difference matrix; extracting a predetermined quantile of each row in the ranked difference matrix; and taking the predetermined quantiles of all the rows as the feature data.

In an optional embodiment, when a quantity of normal examples is the same as a quantity of adversarial examples, the training module 406 is further configured to train a binary classification model according to the feature data and the training example label corresponding to the feature to obtain the detector.

In an optional embodiment, the detecting module 407 is further configured to: acquire the test data; input the test data into the detector to obtain a detection result; and identify the test data as the adversarial examples when a label corresponding to the detection result indicates an adversarial example.

It should be noted that various modules involved in the embodiments are all logic modules, and in practice, one logic unit may be a physical unit, or may be a part of a physical unit, or may be a combination of a plurality of physical units. In addition, for a highlight of the inventive part of the present application, units that are not very relevant to the technical problem to be solved by the present application are not introduced to the above device embodiments of the present application. However, this does not mean that the above device embodiments do not involve other units.

In the embodiment of the present application, the adding module 403 adds the random perturbation at N times to the training examples to obtain the N groups of comparative training examples, the constructing module 405 constructs the feature data according to the second predicted score vector of the N groups of comparative examples and the first predicted score vector of the training examples, the training module 406 trains the classification model according to the feature data to obtain the detector, and the detecting module 407 detects the adversarial examples by using the detector. The training examples include the normal examples and the adversarial examples, after the random perturbation is added at N times, the N groups of comparative training example obtained include the comparative training examples corresponding to the normal examples and the comparative training examples corresponding to the adversarial examples. After the training examples and the comparative training examples are added to the target model, the first predicted score vector and the second predicted score vector are respectively obtained. With respect to the normal examples, a difference between the first predicted score vector corresponding thereto and the second predicted score vector is large. With respect to the adversarial examples, a difference between the first predicted score value corresponding thereto and the second predicted score vector is small. The feature data constructed according to the first predicted score vector and the second predicted score vector may obviously distinguish the normal examples from the adversarial examples, such that the trained detector is capable of effectively detecting the adversarial examples. The adversarial example detection method according to the embodiments of the present application relies on response variations after the comparative examples added with the perturbation and the training examples are input into the target model, instead of relying on the type of the target model. Therefore, in the embodiments of the present application, reliable adversarial example detection may be performed for a classifier with any type of target model.

Figure 6:
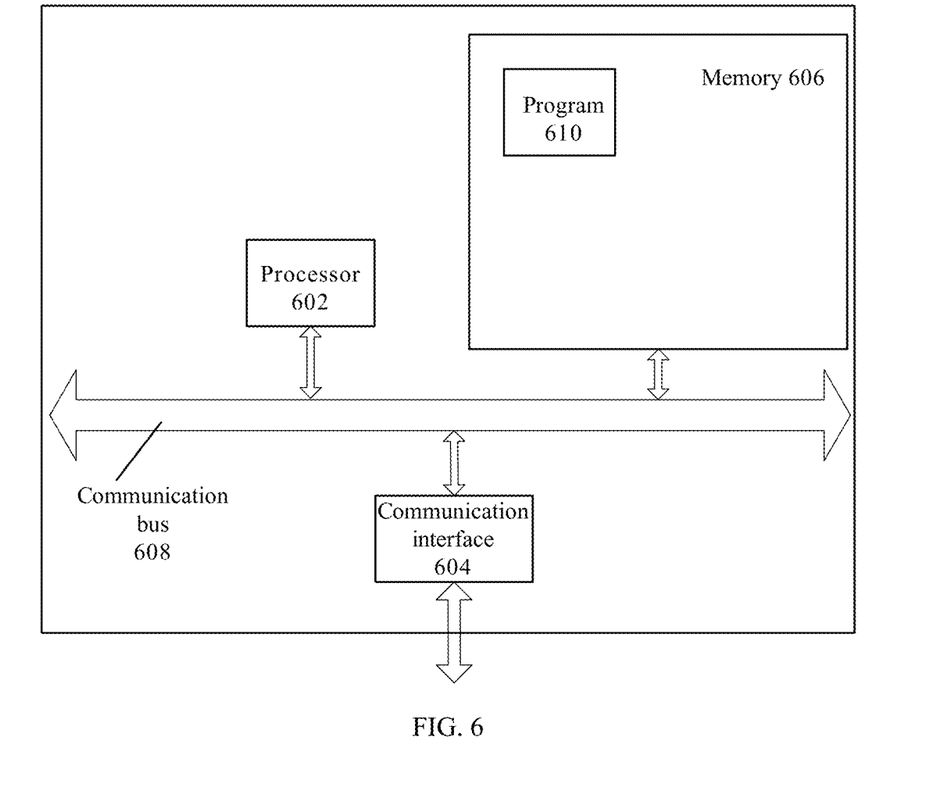
FIG. 6 is a schematic structural diagram of a computing device according to a fifth embodiment of the present application.

FIG. 6 is a schematic structural diagram of a computing device according to a fifth embodiment of the present application.

As illustrated in FIG. 6, the computing device includes: at least one processor 601 and a memory 602, and FIG. 6 uses one processor as an example.

The processor 601 and the memory 602 may be connected via a bus or in another manner, and FIG. 6 uses the bus as an example.

The memory 602, may be configured to store non-volatile software programs, non-volatile computer-executable programs and modules, for example, the program instructions/modules corresponding to the adversarial example detection method in the embodiments of the present application (for example, the acquiring module 401, the first inputting module 402, and the adding module 403 as illustrated in FIG. 5). The non-volatile software programs, instructions and modules stored in the memory 602, when being executed, cause the at least one processor 601 to perform various function applications and data processing of a server, that is, performing the adversarial example detection method according to the above method embodiments.

The memory 602 may include a program storage area and data storage area, wherein the program storage area may store operation systems and application programs needed by at least function; and the data storage area may store data created according to the usage of the apparatus for generating the training data. In addition, the memory 602 may include a high-speed random access memory, or include a non-volatile memory, for example, at least one disk storage device, a flash memory device, or another non-volatile solid storage device. In some embodiments, the memory 602 optionally includes memories remotely configured relative to the processor 601. These memories may be connected to an adversarial example detection apparatus over a network. Examples of the above network include, but not limited to, the Internet, Intranet, local area network, mobile communication network and a combination thereof.

One or a plurality of modules are stored in the memory 602, which, when being executed by the at least one processor 601, perform the method for training the detector and the adversarial example detection method according to any of the above method embodiments, for example, performing steps 101 to 107 in the method as illustrated in FIG. 1, steps 201 to 205 in the method as illustrated in FIG. 2, and steps 301 to 303 in the method as illustrated in FIG. 3, and implementing the functions of modules 401 to 407 in the apparatus as illustrated in FIG. 5.

The product may perform the methods according to the embodiments of the present application, has corresponding function modules for performing the method, and achieves the corresponding beneficial effects. For technical details that are not illustrated in detail in this embodiment, reference may be made to the description of the methods according to the embodiments of the present application.

The computing device in the embodiments of the present application is practiced in various forms, including, but not limited to:

(1) a mobile communication device: which has the mobile communication function and is intended to provide mainly voice and data communications; such terminals include: a smart phone (for example, an iPhone), a multimedia mobile phone, a functional mobile phone, a low-end mobile phone and the like;

(2) an ultra mobile personal computer device: which pertains to the category of personal computers and has the computing and processing functions, and additionally has the mobile Internet access feature; such terminals include: a PDA, an MID, an UMPC device and the like, for example, an iPad;

(3) a portable entertainment device: which displays and plays multimedia content; such devices include: an audio or video player (for example, an iPod), a palm game machine, an electronic book, and a smart toy, and a portable vehicle-mounted navigation device;

(4) a server: which provides services for computers, and includes a processor, a hard disk, a memory, a system bus and the like; the server is similar to the general computer in terms of architecture; however, since more reliable services need to be provided, higher requirements are imposed on the processing capability, stability, reliability, security, extensibility, manageability and the like of the device; and (5) another electronic device having the data interaction function.

An embodiment of the present application further provides a non-volatile computer-readable storage medium. The non-volatile computer-readable storage medium stores computer-executable instructions, which, when being executed by at least one processor, may cause the at least one processor to perform steps 101 to 107 in the method as illustrated in FIG. 1, steps 201 to 205 in the method as illustrated in FIG. 2, and steps 301 to 303 in the method as illustrated in FIG. 3, and implementing the functions of modules 401 to 407 as illustrated in FIG. 5.

An embodiment of the present application further provides a computer program product. The computer program product includes a computer program stored on a non-volatile computer-readable storage medium. The computer program includes program instructions. The program instructions, when being executed by a computer, cause the computer to perform the operations of the adversarial example detection method according to any of the above method embodiments, for example, performing steps 101 to 107 in the method as illustrated in FIG. 1, steps 201 and 205 in the method as illustrated in FIG. 2 and steps 301 to 303 in the method as illustrated in FIG. 3; and implementing the functions of the modules 401 to 407 as illustrated in FIG. 5.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. An adversarial example detection method, comprising:
acquiring training examples and training example labels corresponding thereto, wherein the training example labels comprises normal examples and adversarial examples;
inputting the training examples into a target model to obtain a first predicted score vector of the training examples;
adding a random perturbation at N times to the training examples to obtain N groups of comparative training examples, wherein N is a natural number greater than 0;
respectively inputting the N groups of comparative training examples into the target model to obtain a second predicted score vector of each group of comparative training examples;
constructing feature data according to the first predicted score vector and the second predicted score vector of each group of comparative training examples;
training a classification model according to the feature data and the training example labels corresponding to the feature data to obtain a detector; and
detecting input test data according to the detector;
wherein the constructing the feature data according to the first predicted score vector and the second predicted score vector of the each group of training examples comprises:
computing a difference vector between the first predicted score vector and the second predicted score vector of the each group of comparative training examples; and
constructing feature data according to the N difference vectors of the N groups of comparative training examples;
wherein the constructing the feature data according to the N difference vectors of the N groups of comparative training examples comprises:
performing denoising and dimension-reduction for the N difference vectors to obtain the feature data;
wherein the performing the denoising and dimension-reduction for the N difference vectors to obtain the feature data comprises:
constructing an N-column difference matrix by the N difference vectors;
ranking elements of each row in the difference matrix in an ascending order to obtain a ranked difference matrix;
extracting a predetermined quantile of each row in the ranked difference matrix; and
taking the predetermined quantiles of all the rows as the feature data.

2. The method according to claim 1, wherein the inputting the training example into the target model to obtain the first predicted score vector of the training examples comprises:
inputting the training examples into the target model to obtain a confidence vector corresponding to each training example;
acquiring a maximum value of the confidence vectors to obtain a predicted score of the each training example; and
taking a vector constituted by the predicted scores of all the training examples as the first predicted score vector of the training examples.

3. The method according to claim 1, wherein the adding the random perturbation at the N times to the training examples to obtain the N groups of comparative training examples comprises:
generating the random perturbation according to a predetermined distribution function, the predetermined distribution function being a probability distribution function having predetermined parameters with an average value of 0 and being symmetrically distributed; and
adding the random perturbation at N times to the training examples to obtain the N groups of comparative training examples.

4. The method according to claim 3, wherein the predetermined distribution function is a Gaussian distribution function having an average value of 0.

5. The method according to claim 1, wherein the computing the difference vector between the first predicted score vector and the second predicted score vector of the each group of comparative training examples comprises:
computing a variation rate vector of the second predicted score vector of the each group of comparative training examples relative to the first predicted score vector; and
taking the variation rate vector as the difference vector.

6. The method according to claim 1, wherein when a quantity of normal examples is the same as a quantity of adversarial examples, the training the classification model according to the feature data and the training example label corresponding to the feature to obtain the detector comprises:
training a binary classification model according to the feature data and the training example label corresponding to the feature to obtain a detector.

7. The method according to claim 1, wherein the detecting the input test data according to the detector comprises:
acquiring the test data;
inputting the test data into the detector to obtain a detection result; and
identifying the test data as the adversarial examples when a label corresponding to the detection result indicates an adversarial example.

8. A computing device, comprising: a processor, a memory, a communication interface, and a communication bus; wherein the processor, the memory, and the communication bus communicate with each other via the communication bus; and
the memory is configured to store at least one executable instruction, wherein the executable instruction causes the processor to perform the steps of:
acquiring training examples and training example labels corresponding thereto, wherein the training example labels comprises normal examples and adversarial examples;
inputting the training examples into a target model to obtain a first predicted score vector of the training examples;
adding a random perturbation at N times to the training examples to obtain N groups of comparative training examples, wherein N is a natural number greater than 0;
respectively inputting the N groups of comparative training examples into the target model to obtain a second predicted score vector of each group of comparative training examples;
constructing feature data according to the first predicted score vector and the second predicted score vector of each group of comparative training examples;
training a classification model according to the feature data and the training example labels corresponding to the feature data to obtain a detector; and
detecting input test data according to the detector;
wherein the constructing the feature data according to the first predicted score vector and the second predicted score vector of the each group of training examples comprises:
computing a difference vector between the first predicted score vector and the second predicted score vector of the each group of comparative training examples; and
constructing feature data according to the N difference vectors of the N groups of comparative training examples;
wherein the constructing the feature data according to the N difference vectors of the N groups of comparative training examples comprises:
performing denoising and dimension-reduction for the N difference vectors to obtain the feature data;
wherein the performing the denoising and dimension-reduction for the N difference vectors to obtain the feature data comprises:
constructing an N-column difference matrix by the N difference vectors;
ranking elements of each row in the difference matrix in an ascending order to obtain a ranked difference matrix;
extracting a predetermined quantile of each row in the ranked difference matrix; and
taking the predetermined quantiles of all the rows as the feature data.

9. The computing device according to claim 8, wherein the inputting the training example into the target model to obtain the first predicted score vector of the training examples comprises:
inputting the training examples into the target model to obtain a confidence vector corresponding to each training example;
acquiring a maximum value of the confidence vectors to obtain a predicted score of the each training example; and
taking a vector constituted by the predicted scores of all the training examples as the first predicted score vector of the training examples.

10. The computing device according to claim 8, wherein the adding the random perturbation at the N times to the training examples to obtain the N groups of comparative training examples comprises:
generating the random perturbation according to a predetermined distribution function, the predetermined distribution function being a probability distribution function having predetermined parameters with an average value of 0 and being symmetrically distributed; and
adding the random perturbation at N times to the training examples to obtain the N groups of comparative training examples.

11. The computing device according to claim 10, wherein the predetermined distribution function is a Gaussian distribution function having an average value of 0.

12. The computing device according to claim 8, wherein the computing the difference vector between the first predicted score vector and the second predicted score vector of the each group of comparative training examples comprises:
computing a variation rate vector of the second predicted score vector of the each group of comparative training examples relative to the first predicted score vector; and
taking the variation rate vector as the difference vector.

13. The computing device according to claim 8, wherein when a quantity of normal examples is the same as a quantity of adversarial examples, the training the classification model according to the feature data and the training example label corresponding to the feature to obtain the detector comprises:
training a binary classification model according to the feature data and the training example label corresponding to the feature to obtain a detector.

14. A non-volatile computer-readable storage medium, the storage medium storing at least one executable instruction; wherein the at least one executable instruction, when being executed by a processor, causes the processor to perform the steps of:

acquiring training examples and training example labels corresponding thereto, wherein the training example labels comprises normal examples and adversarial examples;

inputting the training examples into a target model to obtain a first predicted score vector of the training examples;

adding a random perturbation at N times to the training examples to obtain N groups of comparative training examples, wherein N is a natural number greater than 0;

respectively inputting the N groups of comparative training examples into the target model to obtain a second predicted score vector of each group of comparative training examples;

constructing feature data according to the first predicted score vector and the second predicted score vector of each group of comparative training examples;

training a classification model according to the feature data and the training example labels corresponding to the feature data to obtain a detector; and detecting input test data according to the detector;

wherein the constructing the feature data according to the first predicted score vector and the second predicted score vector of the each group of training examples comprises:

computing a difference vector between the first predicted score vector and the second predicted score vector of the each group of comparative training examples; and constructing feature data according to difference vectors of the N groups of comparative training examples;

wherein the constructing the feature data according to the N difference vectors of the N groups of comparative training examples comprises:

performing denoising and dimension-reduction for the N difference vectors to obtain the feature data;

wherein the performing the denoising and dimension-reduction for the N difference vectors to obtain the feature data comprises:

constructing an N-column difference matrix by the N difference vectors;

ranking elements of each row in the difference matrix in an ascending order to obtain a ranked difference matrix;

extracting a predetermined quantile of each row in the ranked difference matrix; and taking the predetermined quantiles of all the rows as the feature data.

* * * * *